Dec. 9, 1941.   G. A. LYON   2,265,241
WHEEL ASSEMBLY
Filed June 4, 1938   2 Sheets-Sheet 1
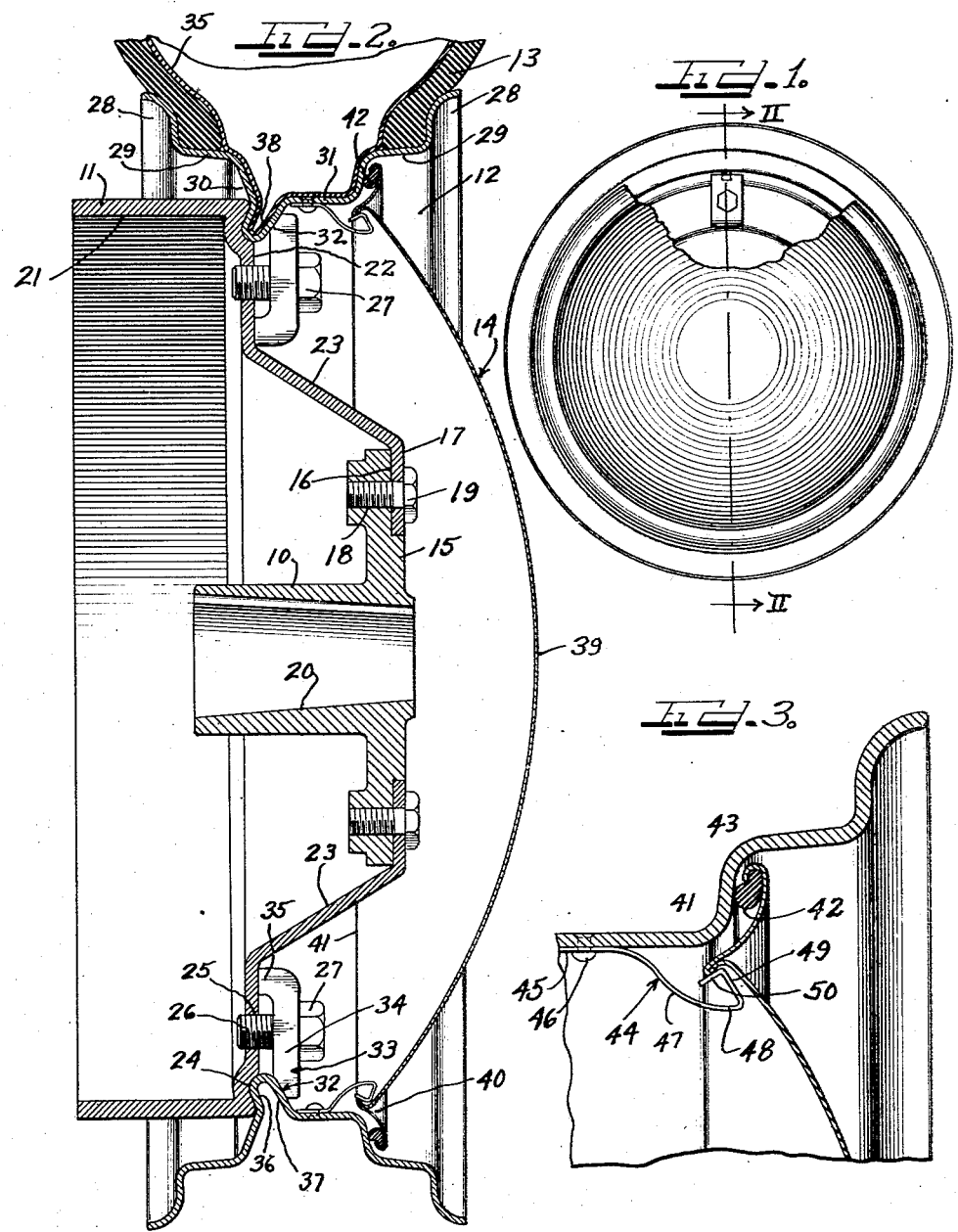
Inventor
GEORGE ALBERT LYON.

Dec. 9, 1941.    G. A. LYON    2,265,241
WHEEL ASSEMBLY
Filed June 4, 1938    2 Sheets-Sheet 2
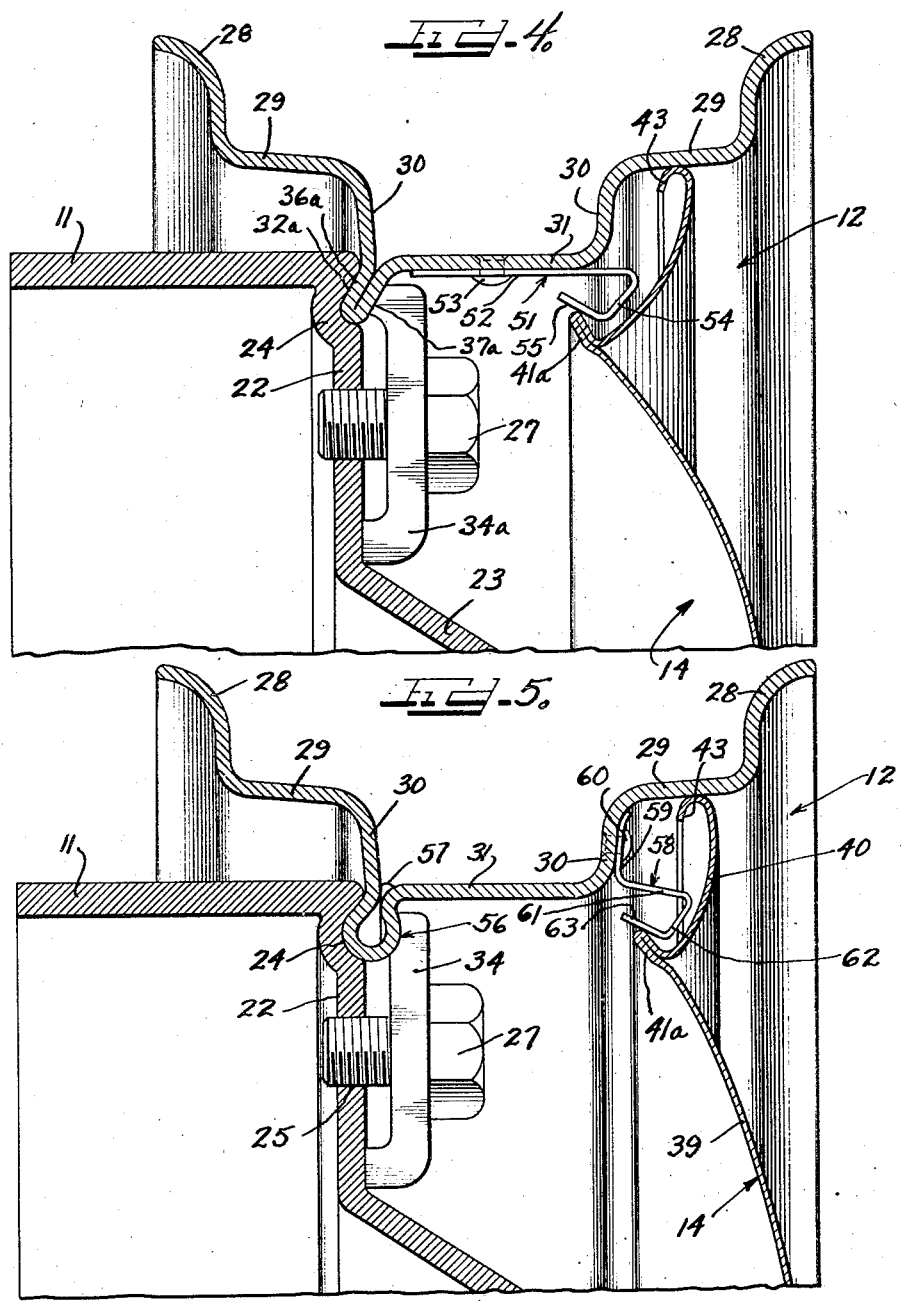
George Albert Lyon.

Patented Dec. 9, 1941

2,265,241

UNITED STATES PATENT OFFICE 2,265,241

WHEEL ASSEMBLY

George Albert Lyon, Allenhurst, N. J.

Application June 4, 1938, Serial No. 211,779

3 Claims. (Cl. 301—11)

This invention relates to a wheel assembly, and more particularly to a wheel assembly which includes a one-piece rim having an integral depending folded fastening flange which is directly secured to a brake drum or other axle part, and an ornamental wheel disk which is secured over the outer face of the wheel by means of a plurality of lift springs or the like.

It is an object of the present invention to provide a novel wheel assembly.

It is another object of this invention to provide a novel wheel assembly which includes a drop-center rim having an integral folded fastening flange depending therefrom which is arranged to be mounted directly on a vehicle brake drum or other axle part.

It is a further object of this invention to provide a wheel assembly in which an ornamental wheel disk is detachably secured to the outer face of a vehicle wheel by means of a plurality of lift springs, the vehicle wheel being in the form of a drop-center rim having an integral folded fastening flange depending therefrom which comprises the body part of the wheel.

Another and further object of this invention is to provide a novel method and means for securing a vehicle wheel to a vehicle brake drum or other axle part.

The novel features which I believe to be characteristic of my invention are set forth and described with particularity in the appended claims. My invention itself, however, both as to its organization and manner of construction, together with further objects and advantages thereof, may best be understood by reference to the following description taken in connection with the accompanying drawings, in which:

Figure 1 is a front elevational view of a vehicle wheel with an ornamental wheel disk mounted thereon, a portion of the wheel disk being broken away to show the manner in which the wheel is mounted on the vehicle brake drum or other axle part;

Figure 2 is an enlarged cross-sectional elevational view taken along the line II—II of Figure 1;

Figure 3 is a greatly enlarged fragmentary sectional view of the lift spring and its association in the assembly;

Figure 4 is a greatly enlarged fragmentary sectional view showing a second embodiment of my invention; and Figure 5 is a view similar to Figure 4, but shows a third embodiment of my invention.

Referring first to the embodiment of my invention which is illustrated in Figures 1 to 3 of the drawings, there is shown a wheel assembly comprising a hub 10, a brake drum 11, a drop-center rim 12, a pneumatic tire 13, and an ornamental wheel disk 14. The hub 10 is provided with a radial flange 15 having a recessed marginal portion 16 which is adapted to seat the radial fastening flange 17 of the brake drum 11. The radial flange 15 of the hub 10 is provided with an annular series of apertures 18 which are internally threaded for receiving the threaded shanks of the fastening bolts 19. The radial flange 17 of the brake drum 11 is, of course, suitably apertured opposite the threaded apertures 18 of the radial flange 15, in order to permit the clamping bolts 19 to pass therethrough. The hub 10 is provided with a tapered bore 20 to receive the complementary end of the vehicle axle (not shown).

The brake drum 11, in addition to the radial fastening flange 17, includes a cylindrical outer portion 21, which comprises the brake drum proper. Extending radially inwardly from the axially outer edge of the cylindrical portion 21 is a radial body portion 22. From the inner end of the radial body portion 22, the brake drum 11 extends obliquely axially outwardly and radially inwardly, as at 23, thereafter merging into the radial fastening flange portion 17. It is, of course, to be understood that the brake drum 11, including the main brake drum portion 21, the radial body portion 22, the oblique portion 23, and the fastening flange portion 17 is preferably formed of a single piece of metal.

The outer marginal portion of the radial body portion 22 of the brake drum 11, is shaped in such a manner as to provide an annular groove 24 for a reason which will presently appear. Radially inwardly of the groove 24, and approximately centrally located in the radial body portion 22, is an annular series of threaded apertures 25, which are adapted to receive the threaded shank 26 of a wheel clamping bolt 27.

The drop-center rim 12 is formed of a single piece of metal stock and includes opposite edge portions 28, intermediate base flanges 29, intermediate side flanges 30, a base flange 31, and an integral folded depending fastening flange 32. The provision of the integral depending folded fastening flange 32 on the rim 12 enables the rim 12 to be directly secured to the brake drum 11 without requiring the usual wheel body portion which is commonly used at the present time.

As will be apparent from a close inspection of Figure 2 of the drawings, the folded fastening flange 32 of the rim 12 is shaped and arranged to be seated in the annular groove 24 of the brake drum 11. Due to the shape of the annular groove 24, the brake drum 11 not only supports the tire rim 12 laterally of the wheel, but also supports it radially. To retain the tire rim 12 in desired seated position on the brake drum 11, a plurality of clamps 33 are employed which have an L-shape cross-section. That is to say, each clamp 33 includes a relatively long leg portion 34 and a relatively short leg portion 35. The long leg portion 34 extends into direct engagement with the depending folded fastening flange 32 of the tire rim 12 in the manner shown in Figure 2, while the short leg portion 35 directly abuts the radial body portion 22 of the brake drum 11. The clamps 33 are apertured to permit the extension therethrough of the clamping bolts 27.

While I have shown a plurality of individual clamps 33 for securing the rim 12 to the brake drum 11, it is to be understood that a ring clamp may be substituted without departing from the spirit and scope of the present invention.

The upper portion of Figure 2 shows a pneumatic tire 13 mounted on the rim 12 with the usual inner tube 35 disposed within the tire 13. The showing of the tire in the lower portion of Figure 2 has been purposely omitted in order to clearly show the true formation and general shape of the rim 12.

As will be observed upon a careful inspection of Figure 2, the depending folded flange 32 of the rim 12 includes an inner side wall portion 36 and an outer side wall portion 37 slightly spaced therefrom. The groove or recess provided by the spacing of the side walls 36 and 37 of the depending fastening flange 32 permits the inner tube to expand therein, as at 38, thereby substantially eliminating pinching of the inner tube in the assembly.

Disposed over the front face of the wheel assembly is an ornamental sheet metal wheel disk 14 which extends substantially over the entire outer surface of the wheel and terminates in proximity to the intermediate base flange 29 of the rim 12. The ornamental wheel disk 14 includes a dome-shaped central portion 39 and an outer convexed ring portion 40. At the junction point of the central dome-shaped portion 39 and the outer ring portion 40, an integral obliquely inwardly and rearwardly extending folded fastening flange 41 is provided. It has been found that the formation of a fastening flange of this character on an ornamental wheel disk enables a substantial saving in manufacturing cost by virtue of the fact that extremely thin sheet metal stock may be used. In fact, metal stock of such thinness may be employed that a single thickness of metal would be deformed by the resilient wheel disk fastening elements (presently to be described), but which is not deformed when a double thickness of metal tightly pressed together in a folded formation is presented to the fastening elements.

The outer edge of the ring portion 40 of the wheel disk 14 is preferably provided with a yieldable cushioning strip 42, composed of rubber or any other suitable material. The cushioning bead 42, as shown, is crimped in between the curled outer edge 43 of the wheel disk 14, as is clearly shown in Figure 3 of the drawings. The yieldable cushioning bead 42 is arranged to abut the outer intermediate side wall portion 30 of the rim 12.

In order to detachably secure the wheel disk 14 to the wheel assembly, a plurality of lift springs 44 are provided and carried on the base flange 31 of the rim 12. The term "lift spring" is employed to indicate that form of fastening finger or spring which enables a wheel disk or other cover member to be readily and easily snapped thereover, but which requires a relatively great force to effect a disengagement between the wheel disk or cover member and the spring due to the fact that in order to disengage the wheel disk therefrom, the outer end of the spring is literally lifted outwardly with the wheel disk as the removal force is initially applied, thereby causing a greater and greater force resisting outward movement of the wheel disk until a critical point is passed and the disk snaps free of the spring. This unique and fundamentally new form of spring action is described and broadly claimed in my copending application for "Ornamental wheel disk and means for mounting same," Serial No. 156,279, filed July 29, 1937.

Referring now to the particular form of "lift spring" shown in Figures 2 and 3 of the drawings, the lift spring 44 includes a base portion 45, which is riveted or otherwise suitably secured to the base flange 31 of the rim 12 as at 46. Extending obliquely forwardly and inwardly from the base portion 45 is an intermediate body portion 47, which is curved gradually forwardly, as at 48, and is then bent sharply radially outwardly and axially inwardly, as at 49. The spring 44 terminates in an obliquely bent-down end portion 50, which extends axially rearwardly and radially inwardly substantially at right angles to the portion 49. The portion 50 of the spring 44 is the portion which snaps up behind the fastening flange 41 of the wheel disk 14 to hold the latter in desired position in the wheel assembly. As the wheel disk 14 is moved into position on the vehicle wheel, it will be understood that the flange 41 first engages the portion 49 causing the same to flex radially inwardly until the high portion of the spring 44 at the junction of portions 49 and 50 passes under the innermost edge of the fastening flange 41. Thereafter, the end portion 50 of the spring 44 snaps up behind the fastening flange 41 to retain the same in desired position on the vehicle wheel. When it is desired to remove the wheel disk 14 from the wheel, a tire tool, screw driver, or other similar tool is inserted between the outer edge 43 of the wheel disk 14 and the tire rim 12, and a sharp outward force is given the wheel disk 14. As the flange portion 41 first starts to move outwardly, the end portion 50 of the spring 44 is lifted or carried along therewith, there being a flexing of the spring 44 at the junction of portions 48 and 49 of the spring 44 as well as at the junction of the portion 47 and the base portion 45. After the spring has passed a critical point, the wheel disk 14 will snap clear of the spring 44 with considerable force.

In Figure 4 of the drawings I have illustrated a second embodiment of my invention. The wheel assembly shown in Figure 4 is similar to the assembly shown in Figures 1 to 3, with the exception that a different form of depending fastening flange is shown on the tire rim and a somewhat different form of wheel disk and wheel disk mounting is shown. In order to simplify the illustration of my invention as much as possible, similar reference numerals have been applied in Figure 4 for corresponding parts of the embodiment of my invention illustrated in Figures 1 to 3. Referring now to Figure 4, the tire rim 12 is provided with an integral depending folded fastening flange 32a, having side walls 36a and 37a pressed tightly together. The depending fastening flange 32a is seated in the groove 24 of the brake drum 11 in the same manner as the depending fastening flange 32 of Figure 2 was seated on the brake drum. In this form of the invention, a C-shaped clamp 34a is employed to hold the flange 32a in tight seated engagement in the groove 24 of the brake drum 11, clamping bolts 27 being employed to tighten the C-shaped clamp 34a in place.

The wheel disk 14 in Figure 4 is substantially similar to the wheel disk 14 in Figure 2, with the exception that an obliquely outwardly and rearwardly extending integral folded fastening flange 41a is employed in the place of the obliquely rearwardly and inwardly extending flange of the form shown in Figure 2. The rubber cushioning bead has also been omitted in this embodiment of the invention and the curled outer edge 43 of the wheel disk 14 is arranged to abut the outer intermediate base flange 29.

A plurality of lift springs 51 are employed to detachably secure the wheel disk 14 on the wheel assembly. The springs 51 include a substantially straight body portion 52 which is seated on the underface of the base flange 31 of the drop-center rim 12, and is secured thereto by means of rivets 53 or in any other suitable manner. The body portion 52 of the springs 51 extends out beyond the end of the base flange 31 for some distance and then is bent abruptly rearwardly and radially inwardly, as at 54. The portion 54 thereafter merges into an obliquely radially outwardly extending end portion 55, which is arranged to bear against the integral folded fastening flange 41a to detachably hold the wheel disk 14 on the wheel.

The spring 51 is believed to operate on the same principle as the lift spring of the first embodiment of the invention, the two principal flexing points of the spring being the junction point of portion 54 with portion 52 and the junction defined by the intermediate part of the portion 52 which lies opposite the outer edge of the base flange 31. Thus the part of the portion 52 which extends axially forwardly beyond the base flange 31 tends to flex around the corner of the base flange 31 and the intermediate side flange 30 of the drop center rim 12. The lift springs 51 thus provides an easy-on hard-off detachable engagement with the wheel disk 14.

In Figure 5 of the drawings, a third embodiment of the present invention is illustrated wherein the drop-center rim 12 is provided with an integral depending folded fastening flange 56, which is substantially in the form of an annular bead which eliminates the sharp bend at the inner edge of the flange 56, but which is closed and preferably welded, as at 57, at its outer side, where it merges into the drop-center rim proper. Aside from this difference, the drop center rim 12 of Figure 5 is secured to the brake drum 11 in a similar manner to that described in connection with Figures 1 to 3 of the drawings.

The wheel disk 14 of the embodiment shown in Figure 5 is of the same type as that illustrated and described in connection with Figure 4 and includes a central dome shaped portion 39 and an outer ring portion 40 which terminates in a curled outer edge 43 that abuts the outer intermediate base flange 29 of the rim 12. An integral folded flange or skirt 41a is provided at the junction of the central dome shaped portion 39 and the outer ring portion 40 of the wheel disk 14.

A different type of lift spring 58, however, is employed for detachably securing the wheel disk 14 of Figure 5 on the wheel assembly. The lift spring 58 includes a base portion 59 which is riveted or otherwise suitably secured to the outer intermediate side flange 30, as at 60. Extending forwardly, or, in other words, axially outwardly from the base portion, 59 is an intermediate body portion 61 which merges at its outer end into an obliquely rearwardly and radially inwardly extending portion 62. The radial inner end of the portion 62 terminates in an obliquely rearwardly and radially outwardly extending end portion 63 which is arranged to engage the fastening flange or skirt 41a of the wheel disk 14. The lift spring 58 provides an easy-on hard-off detachable engagement with the wheel disk 14 by virtue of the fact that it is free to flex at the junction point of the portion 62 with the portion 61 and also at the junction point of the portion 61 with the base portion 59 of the spring 58. When a removal force is applied to the wheel disk 14, the spring 58 is literally lifted so that it tends to move outwardly with the flange 41a until a critical point is reached, when the wheel disk 14 snaps free of the springs 58.

While I have shown particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. A wheel assembly comprising a drum-shape rim supporting part and rim having an integral substantially radially extending folded flange the side walls of which are spaced from each other thereby to provide a tire tube expansion area to eliminate pinching of a tire tube, said rim supporting part having an annular portion defining a groove in proximity to its outer perighery in which said folded flange is seated, and clamping means for holding said folded flange seated in said groove portion of said rim supporting part.

2. A wheel assembly comprising a brake drum including a side wall portion and a peripheral portion, said side wall portion being shaped to provide an annular re-entrant groove on its outer face, a wall of said groove being disposed to face obliquely radially and axially outwardly, and a second wall of said groove lying on the surface of an imaginary cone whose apex is axially rearwardly of said groove, and a drop center rim hiving an integral depending folded portion forming a flange, said rim flange being shaped to extend obliquely radially inwardly and axially rearwardly into seated engagement in said annular groove, and a plurality of L-shaped clamps detachably secured to said brake drum radially inwardly of said groove and disposed to have a leg bear against the axial outer face of said rim flange and to have the other leg abut the face of said brake drum.

3. A wheel assembly comprising a drum-shape rim supporting part and a rim having an integral substantially radially extending folded flange the side walls of which are spaced from each other thereby to provide a tire tube expansion area to eliminate pinching of a tire tube, said rim supporting part having a portion defining a seat for said folded flange, and means attaching said flange to said seat portion.

GEORGE ALBERT LYON.